Sept. 18, 1951   C. C. BATH   2,568,213
PULSE-WIDTH DEMODULATOR
Filed April 3, 1947

Inventor
CARL C. BATH
By Robert J. Killman
Attorney

Patented Sept. 18, 1951

2,568,213

UNITED STATES PATENT OFFICE 2,568,213

PULSE-WIDTH DEMODULATOR

Carl C. Bath, Baltimore, Md., assignor to Bendix Aviation Corporation, Towson, Md., a corporation of Delaware Application April 3, 1947, Serial No. 739,218

6 Claims. (Cl. 250—27)

1

This invention is directed to demodulators, and more specifically to demodulators for detecting a modulating signal from a train of regularly spaced pulses of electrical energy wherein the width or duration of the said pulses has been caused to vary in accordance with the said modulating signal.

Prior arrangements for the "detection" of signals of this character have generally used an excessive number of tubes and circuit components, and have been difficult to adjust and maintain in a satisfactorily operative condition. Furthermore, they usually have comparatively low output voltage capability which depends on the amplitude of the applied pulse signals. In other words, they are gainless systems at best.

It is an object of this invention to provide a detector of pulse-width modulated signals having a high output voltage.

It is a further object of this invention to provide a detector for pulse-width modulated signals which eliminates one or more of the shortcomings of the prior-art arrangements.

The objects of this invention are accomplished by an arrangement including a pair of vacuum tubes, an energy storage device, and a differentiating circuit wherein the energy storage device is rapidly charged through one of the tubes at the instant of the start of a pulse, and discharged through the other tube during the said pulse. The voltage remaining at the energy storage device will then be an inverse function of the duration of the said pulse.

Other and further objects and advantages of the instant invention will be apparent from the following description when the same is read in connection with the accompanying drawings wherein.

Figure 1:
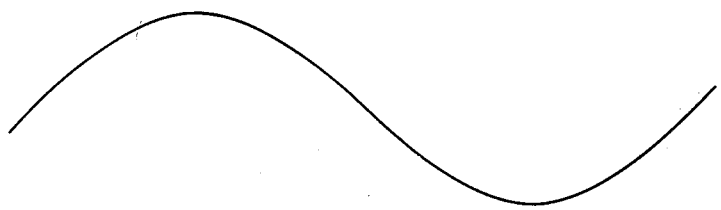
Fig. 1 is a curve representing a modulating voltage wave.
Figure 2:
Fig. 2 is a curve representing a train of pulses which have been pulse-width modulated.

Referring now to Figs. 1 to 4 inclusive, wherein like abscissae denote like instants of time, it will be manifest that the widths of the pulses illustrated in Fig. 2 are inversely proportional to the instantaneous amplitude of the modulating wave of Fig. 1. This represents one form of

2 pulse-width modulation. The curve of Fig. 3 will be seen to comprise a series of pairs of sharp pulses, alternately positive and negative, occurring at the instants of the leading and trailing edges respectively of the Fig. 2 pulses. The Fig. 4 curve represents a step-function approximation of the original modulation signal of Fig. 1, but has high frequency components superimposed thereon in the form of a series of sharp vertical "spikes." These spikes, together with the uneven step-like discontinuities of the Fig. 4 wave may be removed by the use of a conventional low-pass filter without appreciably detracting from the desired intelligence, and a faithful reproduction of the Fig. 1 wave will be obtained. The form that such a filter may take is well known to those skilled in the communications art and will not be introduced here.

Figure 5:
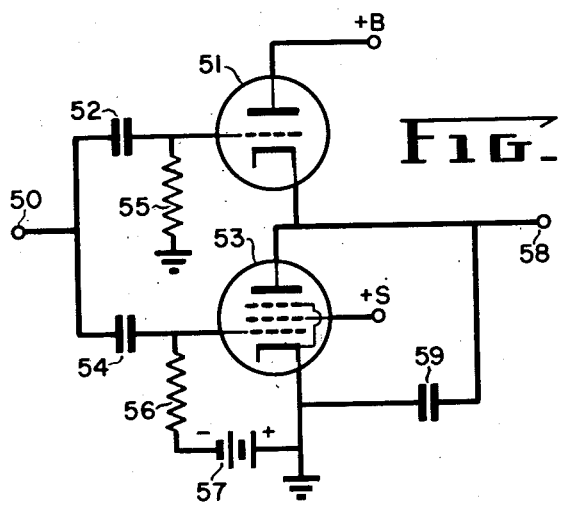
Fig. 5 is a schematic circuit diagram of one embodiment of this invention.

In Fig. 5 there is illustrated an input terminal 50 connected to the control electrode of a triode tube 51 through a small condenser 52, and to the control electrode of a pentode tube 53 through a coupling condenser 54. The control electrode of the tube 51 is connected to ground through a resistor 55, and that of the tube 53 is connected to ground through a resistor 56 and a source 57 of negative bias potential. The anode of the tube 51 is connected to a source of voltage indicated +B, and the anode of the tube 53 is connected to the cathode of the tube 51. The junction of the anode of the tube 53 and the cathode of the tube 51 is connected to an output terminal 58 which is, in turn, connected to ground through a condenser 59. The screen electrode of the tube 53 is connected to a source of positive voltage indicated +S, and the cathode thereof is connected to ground.

In operation a signal having the form of the curve of Fig. 2 is applied to the input terminal 50, and it is this pulse-width modulated signal which is desired to be demodulated. This Fig. 2 waveform is differentiated by the network comprising the condenser 52 and the resistor 55, and the differentiated wave illustrated by the curve of Fig. 3 appears on the control electrode of the tube 51. The Fig. 2 waveform is applied without appreciable alteration to the control electrode of the tube 53, the condenser 54 and the resistor 56 comprising, in this instance, a coupling means. Between pulses the tube 53 is biased to a nonconducting state by the source 57, and the tube 51 is held non-conductive by the forced bias developed across the anode-cathode impedance of the tube 53.

Figure 3:
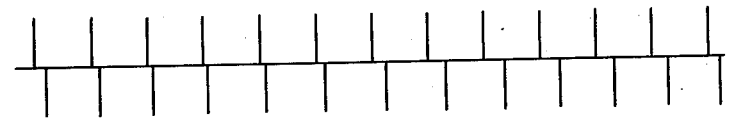
Fig. 3 is a curve representing the first derivative of the curve of Fig. 2.

When the first positive spike, one of the pulses of Fig. 3, appears on the control electrode of the tube 51, the said tube becomes conductive and the condenser 59 quickly charges to a high positive voltage through the anode-cathode path of the tube 51. At the conclusion of the differentiated spike the tube 51 becomes cut off and the rectangular pulse appearing on the control electrode of the tube 53 causes the latter to become conductive. The voltage on the condenser 59 leaks off to ground through the anode-cathode path of the tube 53. This discharge is halted at the conclusion of the rectangular pulse of Fig. 2, and the voltage on the condenser 59 remains at a constant value until such time as the next positive spike is applied to the control electrode of the tube 51. At that time the condenser 59 is again charged up to the previous high value, and the discharging through the tube 53 then takes place for the duration of the signal pulse as before.

Figure 4:
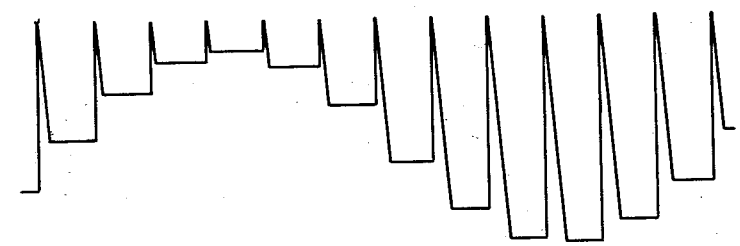
Fig. 4 is a curve representing the output voltage obtained from an arrangement in accordance with the instant invention.

It will be manifest, from the foregoing description, then, that the voltage across the condenser 59, and therefore at the output terminal 58, will have the general form of a step-function with a series of sharp spikes between alternate step, that the level of each step is independent of the level of the preceding step, and that the level of each step is proportional only to the duration of the corresponding signal pulse, as illustrated in Fig. 4, the representation of the desired output wave.

What is claimed is:

1. A detector for pulse-width modulated signals comprising: a first and second electron discharge tube, each having at least an anode, a cathode and a control electrode; a source of potential; means connecting the cathode of said first tube to the anode of said second tube and connecting the space discharge paths of said tubes in series with said source of potential; a source of width modulated pulses, a differentiating circuit connected between said pulse source and the control grid of said first tube; means coupling said pulse source and the control grid of said second tube; means rendering said second tube non-conducting in the intervals between pulses; and an energy storage device connected in shunt with the anode-cathode space of said second tube; said energy storage device forming with said first tube a circuit having a time constant less than that of said differentiating circuit, and said energy storage device forming with said second tube a circuit the time constant of which is greater than that of said coupling means.

2. A detector for pulse-width modulated signals comprising: a pair of electron discharge tubes; a source of potential; means connecting the space discharge paths of said tubes in series with said source; a source of width modulated pulses; a differentiating network connecting said pulse source to the input of a first of said tubes; means coupling said pulse source to the input of the second of said tubes; an energy storage device shunting the space discharge path of said second tube; said energy storage device forming with said first tube a circuit having a time constant less than that of said differentiating circuit, and said energy storage device forming with said second tube a circuit the time constant of which is greater than that of said coupling means.

3. A detector for pulse-width modulated signals comprising: an energy storage device; a charging circuit for said energy storage device including a normally non-conducting electron discharge tube; a source of width-modulated pulses; a differentiating network connecting said source and the input of said tube whereby said tube is rendered conducting and said storage device is charged to a uniform level at the beginning of each of said pulses; the time constant of said storage device and said charging circuit being less than the time constant of said differentiating network; a discharging circuit for said storage device including a second normally non-conducting electron discharge tube; means coupling said pulse source to the input of said second tube, whereby the latter is rendered conducting for the duration of each of said pulses, said storage device being discharged throughout the time said second tube is conducting, the time constant of said storage device and said discharging circuit being longer than that of said coupling means.

4. A detector for pulse-width modulated signals comprising: a source of width modulated pulses; an energy storage device; means differentiating said pulses; means charging said storage device during the positive excursions of said differentiated signals; and means discharging said storage device throughout the duration of each of said pulses, the time constant of said storage means and said charging means being less than that of said differentiating means, and the time constant of said storage device and said discharging means being at least as long as the duration of the widest of said pulses.

5. A detector for pulse-width modulated signals comprising: an energy storage device; means differentiating said signals; means charging said device to a uniform level during the positive excursions of said differentiated signals and means discharging said storage device throughout the duration of each of the undifferentiated signal pulses.

6. A detector for pulse-width modulated signals comprising: an energy storage device; means actuated by the leading edges of said signals to charge said storage device to a uniform level and means actuated by each of said signals to discharge said storage device throughout the duration of each of said signals.

CARL C. BATH.

REFERENCES CITED

The following references are of record in the file of this patent:

UNITED STATES PATENTS

| Number | Name | Date |
| --- | --- | --- |
| 2,391,776 | Fredendall | Dec. 25, 1945 |
| 2,416,305 | Grieg | Feb. 25, 1947 |
| 2,418,127 | Labin | Apr. 1, 1947 |
| 2,451,632 | Oliver | Oct. 19, 1948 |